Figures 1, 2:
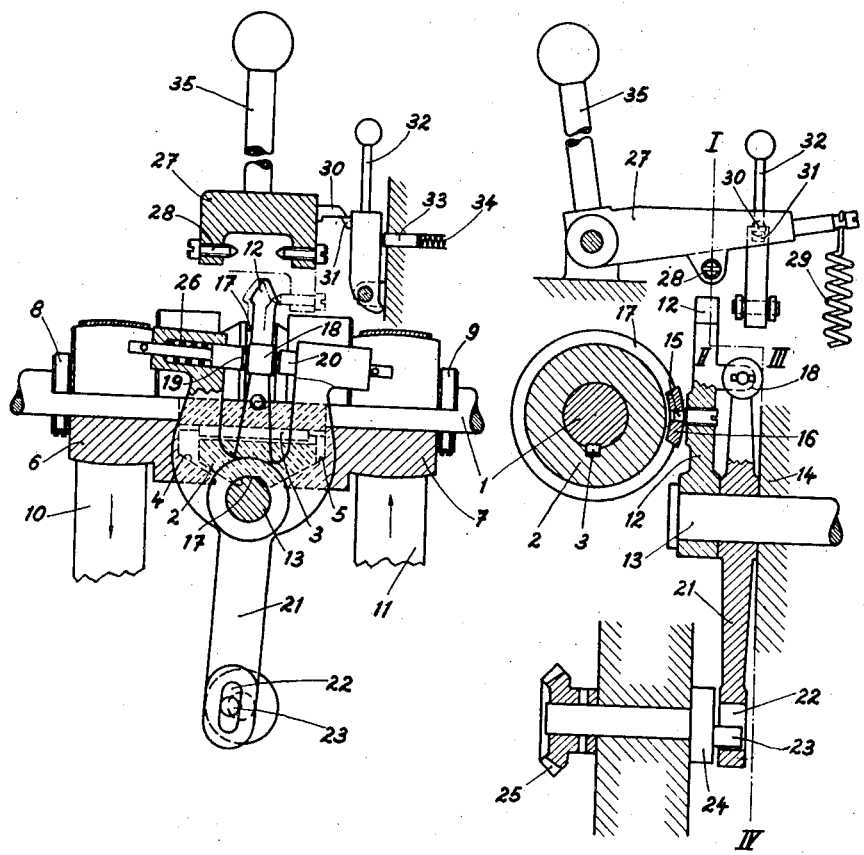

Jan. 10, 1950  A. BECHLER  2,494,156
REVERSING GEAR FOR MACHINE TOOLS
Filed May 28, 1945

Inventor
A. Bechler
By Glascock Downing Hubble
Attys

Patented Jan. 10, 1950

2,494,156

UNITED STATES PATENT OFFICE 2,494,156

REVERSING GEAR FOR MACHINE TOOLS

André Bechler, Moutier, Switzerland

Application May 28, 1945, Serial No. 596,336
In Switzerland June 20, 1944

4 Claims. (Cl. 192—51)

This invention relates to a reversing gear for machine tools, comprising two cones alternately engageable, by means of a driven lever, with two clutch halves rotating at different speeds and/or in opposite directions. According to the invention the two cones are controlled by a second lever loosely mounted on a stationary part of the machine and operated by spring-loaded stops provided on the driven lever.

In a preferred embodiment the cones may be brought into the median position by a fork independently of the momentary position of the driven lever.

The accompanying drawing illustrates, by way of example, one embodiment of the device according to the invention.

Fig. 1 is a front view, partially in section along the line I—II—III—IV of

Fig. 2, which is a side view, partly in section, of the same elements.

The shaft 1 is adapted to be alternately coupled with two pulleys. It carries two cones 2 with their bases turned towards each other and arranged slidably in longitudinal direction on the shaft 1 by means of a key 3 rotating with the shaft 1. The rotation of the latter varies according as one of the cones is engaged with one of the clutch halves 4 or 5 provided on the pulleys 6, 7 loosely rotatable on the shaft 1, where they are held in exact axial position by means of the adjusting rings 8, 9. These pulleys 6, 7 are driven by belts 10, 11.

The cones 2 are controlled by a lever 12 pivoted on a pin 13 fixed to the frame 14 of the machine. This lever is provided with a finger 15 carrying a shoe 16 engaging a groove 17 between the two cones 2. Lever 12 is loosely mounted on the pin 13. It has an arm 18 located between two spring-loaded stops 19 and 20 disposed on the end of a lever 21 likewise mounted on the pin 13 and coupled with the drive of the machine by means of a pin 23 entering a slot 22 of lever 21. Pin 23 is fixed to a disc 24 intermittently driven by a bevelled gear wheel 25.

The stops 19 and 20 are loaded by springs 26 in such a way that, under normal operating conditions, they can, while yielding but slightly, take along by the shoe 16 the two cones 2 in order to engage one of them either with the clutch half 4 or 5.

Above lever 12 a fork 27 with adjustable stops 28 is provided. These stops 28 are adapted to cooperate with the upper end of lever 12 having for this purpose an ogival shape. A spring 29 constantly tends to draw the fork 27 downwards. The latter is held in the position shown in Fig. 1 by a nose 30 resting on an abutment 31 fixed to a lever 32 held in operating position by a pusher 33 and a spring 34. The fork 27 is coupled to a hand lever 35 by means of which it can be manipulated.

If, for one reason or another, the shaft 1 is to be stopped, nothing but manipulation of the handle 32 becomes necessary in order to release the nose 30 and to allow the fork 27 to be moved downwards under the influence of the spring 29. Then, one of the stops 28 at once engages the upper ogival end of lever 12 and moves the latter into a median position in which both cones 2 are disengaged from the clutch halves 4 and 5. This median position can be assumed by lever 12 whatever the position of the driven lever 21 may be, because the spring of one of the adjustable stops 19 and 20 is then more compressed than under normal operating conditions, so that the lever 12 can occupy the position imparted to it by one of the stops 28.

By means of the device described above a suitable stopping of the machine can be obtained at any moment of the automatic cycle and in any relative position of the different parts of the machine.

It is understood that the handle 32 might even be automatically operated. It must, for this purpose, be operated by a disengaging device influenced by special circumstances occurring during normal operation and requiring an immediate stop of the machine.

What I claim is:

1. In a machine reversing gear, a driven lever, two driving clutch members, two driven clutch members alternately movable into engagement with the driving clutch members and also movable into an intermediate inoperative position, a second lever for moving the driven clutch members, spring-loaded stops on the driven lever for yieldably imparting movement to the second lever, and a spring actuated member for engaging and moving the second lever to a position wherein the driven clutch members assume their inoperative position irrespective of the position of the driven lever.

2. In a machine reversing gear, a driven lever, two driving clutch members, two driven clutch members alternately movable into engagement with the driving clutch members and also movable into an intermediate inoperative position, a second lever for moving the driven clutch members, spring-loaded stops on the driven lever for yieldably imparting movement to the second lever, a spring, a nose, and a fork releasably held by said nose and operable under the influence of said spring to engage and move the second lever to a position wherein the driven clutch members assume their inoperative position irrespective of the position of the driven lever.

3. In a machine reversing gear, a driven lever, two driving clutch members, two driven clutch members alternately movable into engagement with the driving clutch members and also movable into an intermediate inoperative position, a second lever for moving the driven clutch members, spring-loaded stops on the driven lever for yieldably imparting movement to the second lever, a spring, a fork operable by said spring to engage and move the second lever to a position wherein the driven clutch members assume their inoperative position irrespective of the position of the driven lever; a nose on said fork, and releasable means coacting with said nose to retain said fork in inoperative position against the tension of said spring.

4. In a machine reversing gear, a driven lever, two driving clutch memebrs, two driven clutch members alternatively movable into engagement with the driving clutch members and also movable into an intermediate inoperative position, a second lever for moving the driven clutch members, spring-loaded stops on the driven lever for yieldably imparting movement to the second lever, a spring, a fork operable by said spring to engage and move the second lever to a position wherein the driven clutch members assume their inoperative position irrespective of the position of the driven lever, a nose on said fork, stop means coacting with said nose to retain the fork in inoperative position, and a disengaging device for operating and releasing said stop means.

ANDRÉ BECHLER.

REFERENCES CITED

The following references are of record in the file of this patent:

UNITED STATES PATENTS

| Number | Name | Date |
| --- | --- | --- |
| 1,752,411 | Amonsen | Apr. 1, 1930 |
| 1,945,486 | Holmes | Jan. 30, 1934 |
| 2,052,650 | Pearman | Sept. 1, 1936 |
| 2,385,734 | Silva et al. | Sept. 25, 1945 |